US010567075B2

(12) United States Patent
Tyagi et al.

(10) Patent No.: US 10,567,075 B2
(45) Date of Patent: Feb. 18, 2020

(54) GIS BASED CENTRALIZED FIBER FAULT LOCALIZATION SYSTEM

(71) Applicant: CENTRE FOR DEVELOPMENT OF TELEMATICS, New Delhi (IN)

(72) Inventors: Vipin Tyagi, New Delhi (IN); Pankaj Kumar Dalela, New Delhi (IN); Atul Kumar Gupta, New Delhi (IN); Ravi Gupta, New Delhi (IN); Anurag Yadav, New Delhi (IN); Arun Yadav, New Delhi (IN); Niraj Kant Kushwaha, New Delhi (IN); Prashant Bansal, New Delhi (IN)

(73) Assignee: CENTRE FOR DEVELOPMENT TELEMATICS, New Delhi (IN)

( * ) Notice: Subject to any disclaimer, the term of this patent is extended or adjusted under 35 U.S.C. 154(b) by 0 days.

(21) Appl. No.: 15/524,973

(22) PCT Filed: May 6, 2016

(86) PCT No.: PCT/IB2016/052596
§ 371 (c)(1),
(2) Date: May 5, 2017

(87) PCT Pub. No.: WO2016/178188
PCT Pub. Date: Nov. 10, 2016

(65) Prior Publication Data
US 2018/0006715 A1    Jan. 4, 2018

(30) Foreign Application Priority Data

May 7, 2015 (IN) .......................... 1283/DEL/2015

(51) Int. Cl.
*H04B 10/07* (2013.01)
*H04B 10/071* (2013.01)
*H04B 10/079* (2013.01)

(52) U.S. Cl.
CPC ....... *H04B 10/071* (2013.01); *H04B 10/0791* (2013.01); *H04B 10/0793* (2013.01); *H04B 10/07* (2013.01)

(58) Field of Classification Search
CPC .............. H04B 10/071; H04B 10/0791; H04B 10/0793; H04B 10/07
(Continued)

(56) References Cited

U.S. PATENT DOCUMENTS 5,845,062 A * 12/1998 Branton, Jr. ........ H04L 41/0853
714/25
6,006,016 A * 12/1999 Faigon ................ G06F 11/2252
714/26

(Continued)

OTHER PUBLICATIONS

Dursum et al, Robust Software Architecture for a Fiber Network Monitoring System, Dec. 2014, International Journal of Advanced Research in Computer Science and Software Engineering, All pages. (Year: 2014).*

*Primary Examiner* — Dibson J Sanchez
(74) *Attorney, Agent, or Firm* — Harness, Dickey & Pierce, P.L.C.

(57) ABSTRACT

Aspects of the present disclosure aim at configuring an optical time domain reflectometry (OTDR) in a central office such that the OTDR is configured to be operatively coupled with and also configured to periodically poll each fiber at defined intervals and compute/store a reflection signature that can be used to compare with future signatures received from subsequent polls of the fiber to determine a fault (e.g., a fiber cut or breakage) between the central office (CO) and one or more optical network unit (ONU) over GIS.

6 Claims, 4 Drawing Sheets

(58) Field of Classification Search
USPC .......................................... 398/9–38, 43–103
See application file for complete search history.

(56) References Cited

U.S. PATENT DOCUMENTS

| | | | | |
|---|---|---|---|---|
| 6,141,777 A * | 10/2000 | Cutrell | ................ | G06F 11/327 379/1.01 |
| 6,317,535 B1 * | 11/2001 | Jennings | ............ | G01M 11/3136 385/24 |
| 7,136,156 B1 * | 11/2006 | Quint | ................ | G01M 11/3136 356/73.1 |
| 7,242,862 B2 * | 7/2007 | Saunders | ........... | H04B 10/0793 398/16 |
| 7,469,247 B2 * | 12/2008 | Cossins | ............... | H04L 41/0253 |
| 7,558,212 B2 * | 7/2009 | Olinski | ............... | H04L 41/0677 370/242 |
| 8,588,571 B1 * | 11/2013 | Lam | ................... | H04B 10/272 385/135 |
| 8,655,167 B1 * | 2/2014 | Lam | ................... | H04B 10/071 398/16 |
| 8,693,866 B1 * | 4/2014 | Lam | ................... | H04B 10/071 398/13 |
| 8,782,282 B1 * | 7/2014 | Zhou | ..................... | H04L 41/50 709/203 |
| 8,917,987 B2 * | 12/2014 | Wen | ..................... | H04B 10/071 398/16 |
| 2003/0081282 A1 * | 5/2003 | Yamakawa | ........ | H04B 10/0793 398/79 |
| 2004/0004709 A1 * | 1/2004 | Pitchforth, Jr. | ...... | H04B 10/071 356/73.1 |
| 2004/0031059 A1 * | 2/2004 | Bialk | ................... | H04L 41/065 725/129 |
| 2004/0078683 A1 * | 4/2004 | Buia | ..................... | H04L 12/66 714/37 |
| 2005/0108387 A1 * | 5/2005 | Li | ......................... | H04L 41/026 709/224 |
| 2006/0007426 A1 * | 1/2006 | Weller | ................. | H04B 10/071 356/73.1 |
| 2006/0092404 A1 * | 5/2006 | Weller | ................. | H04B 10/071 356/73.1 |
| 2006/0110161 A1 * | 5/2006 | Cho | ..................... | H04B 10/071 398/72 |
| 2006/0258348 A1 * | 11/2006 | Rajala | ................. | H04L 41/069 455/423 |
| 2008/0085114 A1 * | 4/2008 | Nakajima | ......... | G01M 11/3145 398/33 |
| 2008/0086278 A1 * | 4/2008 | Nakayama | ........ | G01M 11/3136 702/84 |
| 2008/0292314 A1 * | 11/2008 | Lu | ..................... | H04B 10/0773 398/58 |
| 2008/0304823 A1 * | 12/2008 | Mahony | ............ | H04Q 11/0067 398/13 |
| 2008/0304825 A1 * | 12/2008 | Mahony | ............ | H04Q 11/0067 398/38 |
| 2009/0027656 A1 * | 1/2009 | Zhang | ................ | G01M 11/3118 356/73 |
| 2009/0092388 A1 * | 4/2009 | Yang | .................... | H04B 10/071 398/13 |
| 2009/0190921 A1 * | 7/2009 | Nakajima | ......... | G01M 11/3136 398/13 |
| 2011/0001959 A1 * | 1/2011 | Hasegawa | ......... | G01M 11/3172 356/73.1 |
| 2011/0013904 A1 * | 1/2011 | Khermosh | ........ | G01M 11/3118 398/16 |
| 2011/0255860 A1 * | 10/2011 | Lee | ..................... | H04B 10/071 398/12 |
| 2011/0268438 A1 * | 11/2011 | Daems | ............... | G01M 11/3136 398/16 |
| 2012/0045205 A1 * | 2/2012 | Perron | .............. | H04B 10/0795 398/48 |
| 2012/0134663 A1 * | 5/2012 | Wang | ................... | H04B 10/032 398/5 |
| 2012/0253728 A1 * | 10/2012 | Chamas | ............. | G06F 11/2294 702/109 |
| 2013/0116838 A1 * | 5/2013 | He | ......................... | G06Q 10/06 700/286 |
| 2013/0259469 A1 * | 10/2013 | Smith | ................. | H04J 14/0227 398/16 |
| 2014/0003806 A1 * | 1/2014 | Urban | ................ | G01M 11/3127 398/21 |
| 2014/0111795 A1 * | 4/2014 | Barnhart | ........... | G01M 11/3136 356/73.1 |
| 2014/0133845 A1 * | 5/2014 | Dahlfort | ............ | H04B 10/0771 398/12 |
| 2014/0136139 A1 * | 5/2014 | LaBonge | ............... | H04B 10/07 702/122 |
| 2014/0226970 A1 * | 8/2014 | Urban | ................ | G01M 11/3127 398/21 |
| 2014/0310605 A1 * | 10/2014 | Basile | ................... | H04L 41/22 715/736 |
| 2015/0016816 A1 * | 1/2015 | Piehler | ................ | H04B 10/071 398/10 |
| 2016/0277102 A1 * | 9/2016 | Kim | ..................... | H04B 10/071 |
| 2017/0180041 A1 * | 6/2017 | Yi | ......................... | H04B 10/071 |
| 2017/0279523 A1 * | 9/2017 | Parkin | ................. | H04B 10/071 |
| 2018/0324194 A1 * | 11/2018 | Nakanelua | ......... | H04L 63/1425 |

* cited by examiner

GIS BASED CENTRALIZED FIBER FAULT LOCALIZATION SYSTEM

TECHNICAL FIELD

This disclosure relates generally to fiber optic networks and in particular but not exclusively, relates to diagnostic layout for fiber optic networks.

BACKGROUND

Background description includes information that may be useful in understanding the present invention. It is not an admission that any of the information provided herein is prior art or relevant to the presently claimed invention, or that any publication specifically or implicitly referenced is prior art.

Fiber networks can be used to transport light that is modulated to carry information and to deliver communication services in various configurations, including broadband fiber-to-the-premise ("FTTP") communication services. In order to promote widespread deployment of FTTP broadband infrastructure, it is desirable to reduce the cost of fiber plant construction, which consists of as much as 80% of the total cost for FTTP deployments and is dominated by labour costs in developed countries. Techniques that can reduce this upfront expense associated with the initial fiber plant can further this goal. However, ongoing operation and maintenance expenses associated with the fiber plant also impact the adoption rate of FTTP communication services. One such expense is the detection and finding location of fiber faults (e.g., a fiber cut, disconnection or breakage) that interrupt communication services. Such detection is necessary for repairing the broken fiber link and restoring the communication services. Techniques that can quickly and efficiently detect and locate these faults reduce the operation and maintenance expenses and further encourage adoption of FTTP communication services. In addition, these techniques shorten service outage time and improve user experiences.

Existing and known architectures require manual use of optical time domain reflectometry ("OTDR"), wherein OTDR is a measurement technique used to quickly and efficiently diagnose a fiber plant and identify location of a fiber fault that brings down or otherwise degrades a transmission link. OTDR can be applied to a faulty fiber link to localize faults such as a fiber cut, a macro bend, etc. OTDR gives the optical distance of the fiber fault (called events) from the source where the OTDR test signal is launched. When combined with geographic information system ("GIS") data regarding the physical routes of the fiber plant and knowledge of which customer has lost communication with the central office providing the communication services, OTDR can be leveraged to quickly and efficiently identify and map the fiber fault location. As such, an effective fault diagnosis strategy that leverages the advantages of OTDR can help reduce operating costs of an FTTP access network. However, existing OTDR based techniques require strong manual intervention every time a fault is reported, wherein a technician takes OTDR to the fiber location, identifies optical distance of the fault using the OTDR, and then maps the distance on the GIS map to determine the location, which due to difference in optical distance vs actual physical distance makes it difficult for the technician to locate/rectify the actual fault location/site.

Therefore, OTDR fault diagnosis starts with identifying fiber link associated with CP that has lost service. A loss of signal may be a complete loss of communication with the CO or an unacceptable degradation of the communication link. Once the fiber link is identified, an optical test signal is launched at the head end into the faulty fiber link and the head end of the link is monitored for reflections or a "reflection signature" which may be analyzed to identify the location of the fiber fault. Since a pt-2-pt access network requires a homerun fiber termination to each CP, a large number of fiber links are terminated in the CO. In fact, a CO in an urban or suburban neighbourhood can expect to terminate as many as 50,000 pt-2-pt fiber links extending to various CPs. Conventionally, a technician physically present at the CO is needed to identify and manually couple the OTDR unit to the faulty fiber link. To speed up fiber diagnosis for pt-2-pt access networks, an OTDR test system needs the capability to pre-connect each homerun access fiber with an OTDR unit or have the capability to automatically switch a shared ODTR unit to the right fiber link. Hardware has been designed to share single OTDR with multiple fibers. Brute-force methods include coupling a single OTDR per fiber link or a very large-port-count optical switch can be used to multiplex the OTDR unit across a large number of fiber links. However, such brute-force approaches are prohibitively expensive.

There is therefore a need in the art for an improved architecture, technique, and method for efficiently, accurately, and quickly detecting the precise fault location.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTS OF THE INVENTION

It an object of the present disclosure to provide an improved architecture, technique, and method for efficiently, accurately, and quickly detecting precise fault location in fiber optic networks.

SUMMARY

This disclosure relates generally to fiber optic networks and in particular but not exclusively, relates to diagnostic layout for fiber optic networks.

In an aspect, the present disclosure relates to a fiber fault localization system (FFLS) comprising a central office (CO), FFLS Server at NOC (Network Operations Center) and a hardware operatively coupled with the CO; wherein the hardware comprises an OTDR that is configured to measure reflection signatures of one or more customer premises equipments and wherein the FFLS compares measured reflection signatures with stored signatures so as to report any abnormality to NMS.

In an aspect, the hardware can further include an OTDR controller. In another aspect, the OTDR reports the abnormality to the CO by means of an OTDR file. In another aspect, the OTDR can measure the reflection signatures of the one or more customer premises equipments at periodic/defined intervals. In another aspect, the hardware can be coupled with the one or more customer premises equipments through a passive fiber layout. In another aspect, the CO, upon receipt of abnormality information from the OTDR, processes the information and sends the processed information to EMS. In another aspect, the EMS, upon receipt of the processed information, can send the processed information or a part thereof to NMS, wherein the NMS sends the processed information or a part thereof, to a FFLS server. FFLS server receives topological information of network from Network Digitalization Tool (NDT). In yet another aspect, the FFLS server processes received information to issue GIS based fiber fault localization information back to the NMS to enable the NMS to accurately indicate exact location/position of the fault. In yet another aspect, the NMS can be operatively coupled with one or more OTDR's through the CO.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined below, it should be given the broadest definition persons in the pertinent art have given that term as reflected in printed publications and issued patents at the time of filing.

Embodiments of a system and method of operation of a point-to-point (pt-2-pt) fiber-to-the-premise ("FTTP") access network that includes a test signal distribution unit for multiplexing an optical time domain reflectometry ("OTDR") unit across many pt-2-pt fiber links to efficiently identify and locate fiber faults are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Aspects of the present disclosure aim at configuring an optical time domain reflectometry (OTDR) in a central office such that the OTDR is configured to be operatively coupled with and also configured to periodically poll each fiber at defined intervals and compute/store a reflection signature that can be used to compare with future signatures received from subsequent polls of the fiber to determine a fault (e.g., a fiber cut or breakage) between the central office (CO) and one or more optical network unit (ONU).

According to one embodiment, as each fiber in a given central office can be coupled with a resident/permanent OTDR, non-matching of reflection signature (at FFLS software) of any fiber with the signature of the previous sample can be a strong and quick indicator of a fault, which can be picked up instantaneously by the OTDR, and then reported to a Network Management System (NMS) for passing to FFLS software, of the present invention. The proposed system has hardware configured to cater to multiple fibers that are operatively coupled with at least one OTDR, technology specific software, and an interface for the NMS. The NMS can be configured to receive fault indicator from the OTDR and also receive an alarm configured to indicate the type of fault, severity, frequency of fault, among other attributes. Based on the information received in real-time from the OTDR, the FFLS can be configured to determine the type/configuration/construction/number of connectors, splices, among other hardware elements configured in the fiber layout, along with accurately distinguishing between pt-2-pt and point-to-multipoint technology, in order to determine the actual physical distance from the CO where the fault has taken place, and then map the distance with the GIS map to accurately reach the fault location. In an aspect, the OTDR can be configured to take trace corresponding to alarms of CP at NMS, based on which the OTDR files can then be passed to FFLS coupled with alarms via NMS. FFLS processes this information for trace mismatch and correlates the derived information with digital GIS maps to localise fault. The extrapolated fault localisation information can be passed to NMS for further reporting to rectification team.

This disclosure relates generally to fiber optic networks, and in particular but not exclusively, relates to diagnostic layout for fiber optic networks.

In an aspect, the present disclosure relates to a fiber fault localization system (FFLS) comprising a central office (CO); and a hardware operatively coupled with the CO; wherein the hardware comprises an OTDR that is configured to measure reflection signatures of one or more customer premises equipments, and wherein the FFLS compares measured reflection signatures with stored signatures so as to report any abnormality to NMS.

In an aspect, the hardware can further include an OTDR controller. In another aspect, the OTDR reports the abnormality to the CO by means of an OTDR file. In another aspect, the OTDR can measure the reflection signatures of the one or more customer premises equipments at periodic/defined intervals. In another aspect, the hardware can be coupled with the one or more customer premises equipments through a passive fiber layout. In another aspect, the CO, upon receipt of abnormality information from the OTDR, processes the information and sends the processed information to EMS. In another aspect, the EMS, upon receipt of the processed information, can send the processed information or a part thereof to NMS, wherein the NMS sends the processed information or a part thereof, to a FFLS server. FFLS server receives topological information of network from Network Digitalization Tool (NDT). In yet another aspect, the FFLS server processes received information to issue GIS based fiber fault localization information back to the NMS to enable the NMS to accurately indicate exact location/position of the fault. In yet another aspect, the NMS can be operatively coupled with one or more OTDR through the CO.

Figure 1:
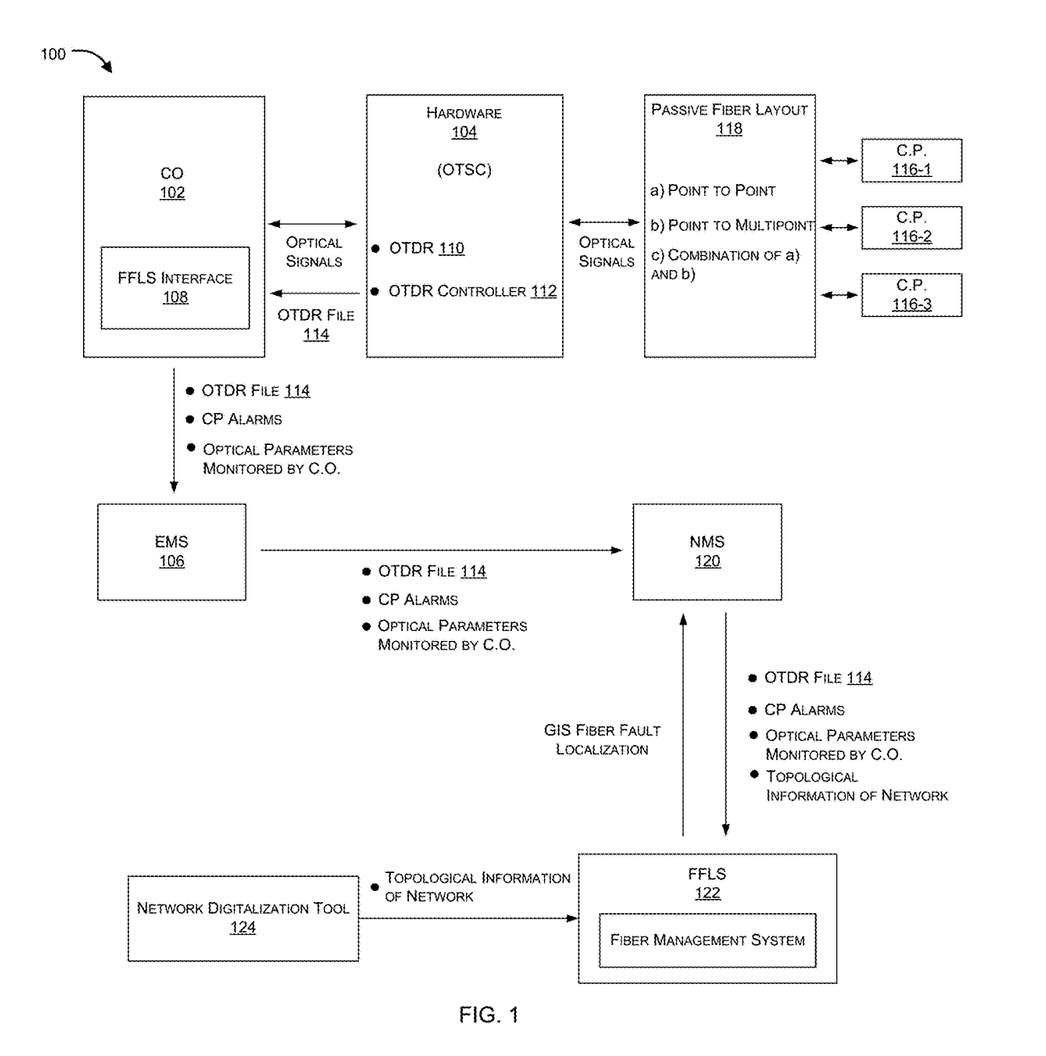
FIG. 1 illustrates an exemplary architecture of the proposed system in accordance with an embodiment of the present disclosure.

FIG. 1 illustrates an exemplary architecture of the proposed system in accordance with an embodiment of the present disclosure. One should appreciate the proposed architecture/layout is completely exemplary in nature and any other system/architecture can be configured as part of the proposed invention. As seen, the proposed system/architecture 100 can include a central office (CO) 102 that is operatively coupled with hardware 104 and an Element Management System (EMS) 106, wherein the CO 102 can include an interface 108 for the fiber fault localization system (FFLS) to communicate with hardware and send OTDR file to EMS. In an aspect, the hardware 104 can include an OTDR 110 and an OTDR controller 112, which can be configured to measure reflection signatures/timestamps/period at defined intervals and report any abnormality or even normality (if configured) to the CO 102 by means of an OTDR file 114.

According to another embodiment, the hardware 104 can be operatively coupled with one or more customer premises 116-1, 116-2, 116-n, collectively referred to as customer premise(s) CP 116 hereinafter, by means of a passive fiber layout 118. OTDR 110 can periodically, say in a round robin fashion, check for the proper working of each fiber, and any change/deviation from normal behaviour can be reported back to the CO 102 along with the details of the fiber in context, type of connection, number of splicers/connectors/hardware elements.

According to another embodiment, once reported, the CO 102 can process the received information, and send the processed OTDR file 114 along with alarms generated from the faulty CP 116 to EMS 106. Other configured optical parameters monitored by the CO 102 can also be reported to the EMS 106. Once received, the EMS 106 can send the received information (after or before processing) to NMS 120, which can send the information to FFLS 122. FFLS receives the topological information of the network from Network Digitalization Tool 124, wherein the FFLS 122 can process the complete received information and issue GIS based Fiber fault localization information back to the NMS 120 to enable the NMS 120 to accurately indicate the exact location/position of the fault.

According to one embodiment, the NMS 120 can be configured in a web-based architecture, enabling the NMS 120 to be operatively coupled with multiple OTDR's through CO 102 across a number of geographies in order to provide a centralized fault location technique by receiving fault indicator information from one or more OTDR's and then map the information to calculate accurate physical distance and then process the derived information with digital GIS map with specific attributes for fiber fault localization. NMS will get the type of fault, junction box/node/branch to which the fault pertains, nature of alarm generated, along with other fault location attributes such as landmarks (e.g. ATM, restaurant, mall, hospital, monument, among other like landmark) through Fiber Fault Localisation System (FFLS) intelligence.

According to one embodiment, as point-to-multipoint optical networks use optical splitters to enable a single fiber to serve multiple customer premises (e.g., 32 to 128 customer premises), distinguishing between pt-2-pt connections from point-to-multipoint connection can enable accurate determination of the number of splitters, connectors, among other elements and hence accurately map the optical length/distance with the physical distance. For instance, pt-2-pt connections use a different topology by enabling a string to be configured to separate a homerun fiber from a carrier central office ("CO") all the way to each customer premise ("CP").

Figure 2:
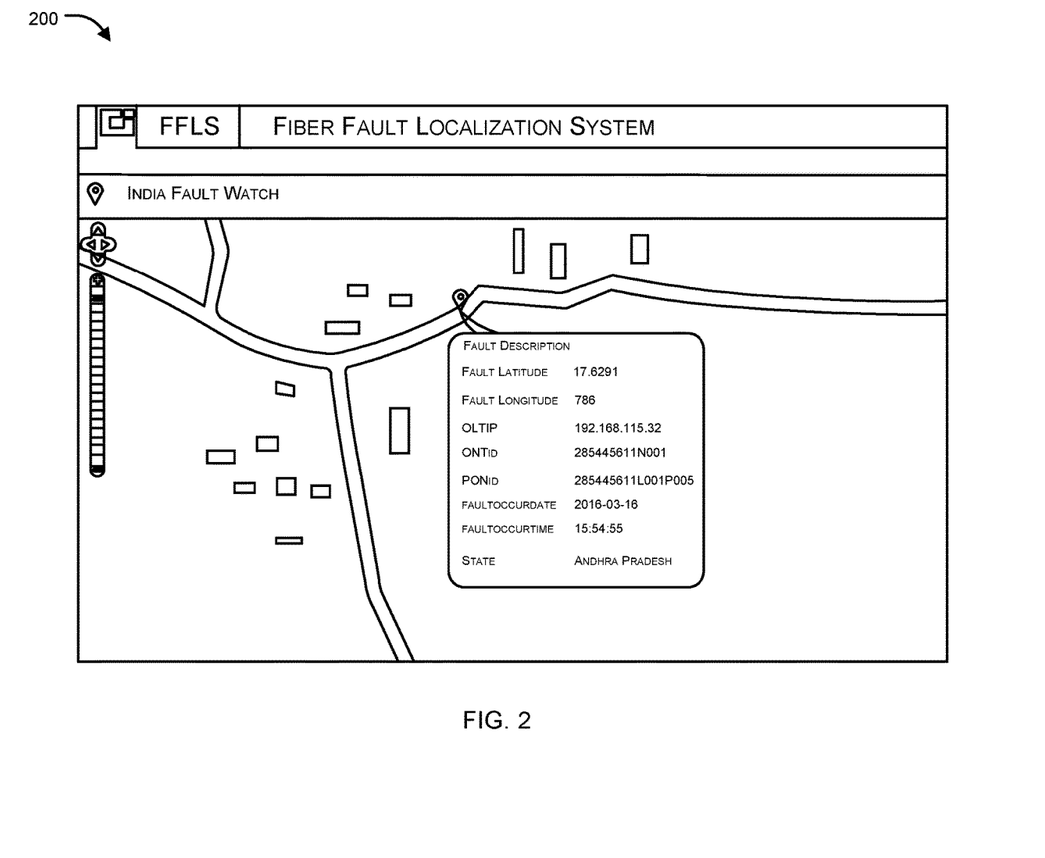
FIG. 2 illustrates an exemplary representation of an FFLS web server interface showing fiber fault GIS location with attributes in accordance with an embodiment of the present disclosure.

In an aspect, the proposed fiber fault localization system (FFLS) detects and locates fibre fault (fibre cut or removal of connector) along with overlay of fault location (latitude, longitude) on GIS Map (private or public) taking satellite imagery as background. The proposed FFLS for a specific fibre based technology utilizes deployed network (Central Office (CO) 102 and Customer Premise Equipments (CPE) 116 as topological nodes along with its NMS) considering technology specific parameters e.g. link budget and ranging along with its physical coverage. In an aspect, the proposed FFLS can be customized with any optical communication technology. FIG. 2 illustrates an exemplary representation of an FFLS web server interface showing fiber fault GIS location with attributes in with an embodiment of the present disclosure.

In an aspect, the proposed system works in real-time is always in ON mode. The technology works for point-to-point or even for point-to-multipoint optical technology. The proposed disclosure is a centralized system that uses NMS 120 to fetch relevant information for fault detection, wherein the deduction of fault location on GIS (on pre-feed Map) has been processed on FFLS server 122. The deduced information (GIS) can be accessed/sent to any authorized user.

Furthermore, the proposed subject matter provides accuracy for fault location depending on accuracy of GIS Map and fibre layout condition. In an exemplary aspect, for accurate GIS, accuracy can be mapped by keeping Point to Point to approximately 5 m, Point to Multipoint to 22 m (for 20 km distance), time to detect and localize fault to approx. 2 mins, cater for 16 fiber per CO (e.g. 16 PON port per OLT), enable the FFLS Server to handle multiple COs e.g. OLTs per NMS, and be able to detect multiple faults simultaneously.

Figure 3:
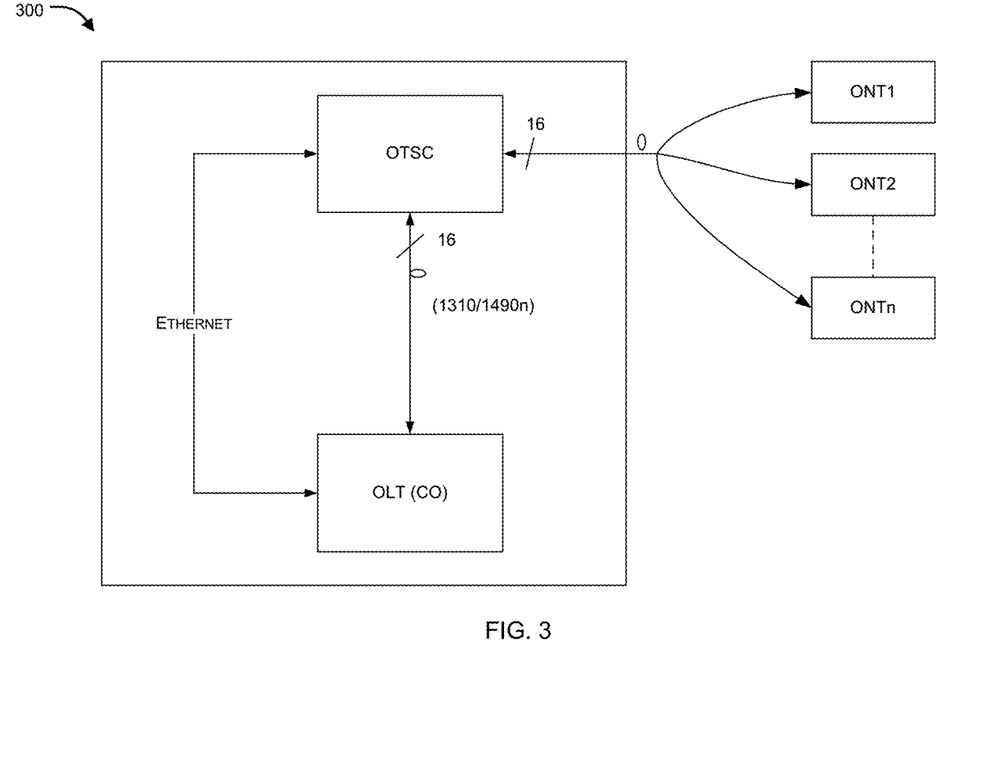
FIG. 3 illustrates OTSC interfacing with the CO in accordance with an embodiment of the present disclosure.

With reference to FIG. 1, in an aspect, the proposed FFLS 100 can include CO 102 (shown as GPON OLT), CPE, OTSC (in-built or outside OTDR (specific)) 104, NMS 120 access (modified for FFLS), GIS Map of fibre with Attributes, and FFLS Server Application 122. In an aspect, the GPON can be based on ITUT-984.x consisting of ONT (C.P.E.) and OLT (C.O.). It would be appreciated that although the proposed FFLS has been exemplified with reference to GPON, it can be replaced with other optical transmission technologies In an aspect, OTSC 104 can include FFLS hardware that resides at CO, and can further include OTDR integrated with optical switch manageable from FFLS server. FIG. 3 illustrates OTSC interfacing with the CO.

In an aspect, the proposed FFLS requires NMS 120 to provide an information gateway between OLT and FFLS. The OTSC interface can require Ethernet port for interfacing with CO. e.g. in case of GPON, FFLS has an integrated software module at OLT for managing OTSC.

In another aspect, FFLS server 122 can be a centralized web based application that can reside at NOC along with NMS or may be at independent location. The server 122 can be configured to get information through FFLS-NMS interface and localize fiber fault to optical distance. Furthermore, the detected fault can be passed through mail server and SMS. Furthermore, in an aspect, the operator can see current fault location by using FFLS Android application. In yet another aspect, the server can be integrated with Fiber Management System and Network Digitalization Tool. In an aspect, the Network Digitalization Tool (NDT) can be configured to incorporate GIS data required for FFLS. Furthermore, telecom assets (Fiber Map, CO, CPE, splitters etc.) can be fed by interactive user graphics provided by NDT. Furthermore, the GIS data (OGC complaint shape files) can be uploaded into it (if data already digitized).

In another aspect, the fiber management system (FMS) can be configured as part of the FFLS, wherein the FMS can be used to manage laid Fiber Network Geo-referenced Telecom Grade GIS Data. The FMS can store data into topological entitles and extrapolate fiber spools in the network if not provided. FMS can further be configured to correlate Fiber fault with GIS distance and pin-point it to GIS Map (duct, cable, fiber). Furthermore, GIS Map of FMS can be integrated with satellite Imagery of third party (ISRO, google, Bing etc.)

Figure 4:
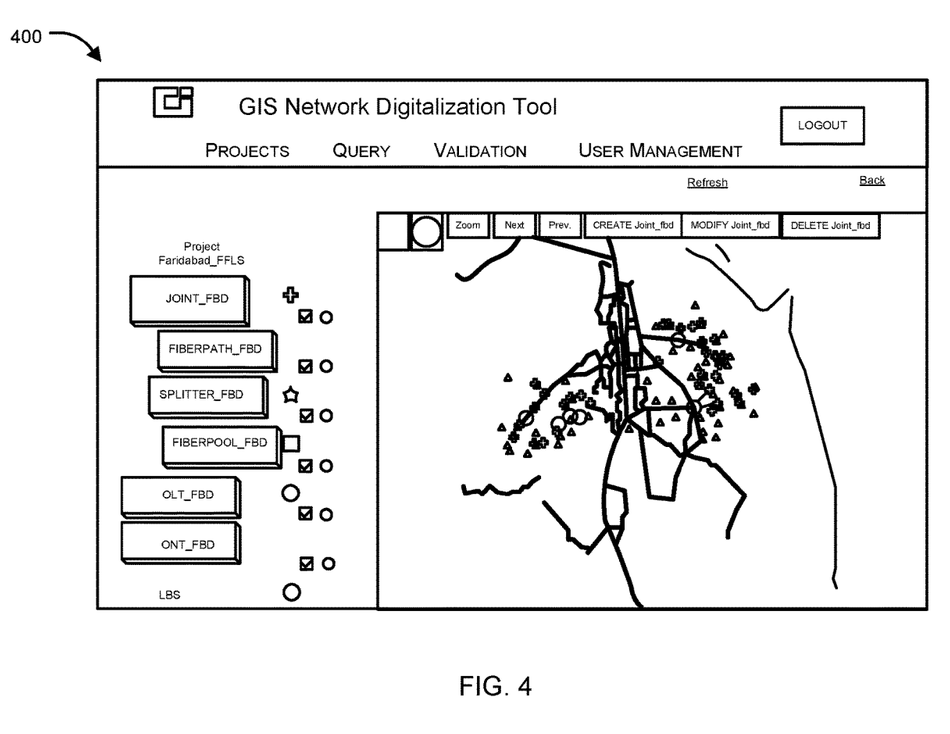
FIG. 4 illustrates an exemplary representation showing network digitalization tool user interface for feeding GIS data.

FIG. 4 illustrates an exemplary representation 500 showing network digitalization tool user interface for feeding GIS data.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure provides an improved architecture, technique, and method for efficiently, accurately, and quickly detecting precise fault location in fiber optic networks.

We claim:

1. A fiber fault localization system (FFLS) comprising:
a central office (CO); and
a hardware operatively coupled with the CO, wherein the hardware comprises an OTDR that is configured to measure reflection signatures of one or more customer premises equipments and compare the measured reflection signatures with stored signatures so as to report any abnormality to the CO;
wherein upon receipt of abnormality information from the OTDR, the CO processes the abnormality information to determine a fault and sends the processed information to an element management system (EMS) so that the EMS sends the processed information or a part thereof to a network management system (NMS) and the NMS sends the processed information or a part thereof to at least an FFLS server,
wherein the FFLS server processes received information and network topological information to issue geographic information system (GIS) based fiber fault localization information including physical distance of the fault from the CO, to the NMS, and
wherein the NMS uses the GIS based fiber fault localization information to accurately indicate exact location and one or more attributes of the fault on a GIS map, the one or more attributes including any or a combination of latitude, longitude, hardware information, date, time and type of the fault.

2. The system of claim 1, wherein the hardware further comprises an OTDR controller.

3. The system of claim 1, wherein the OTDR reports the abnormality to the CO by means of an OTDR file.

4. The system of claim 1, wherein the OTDR measures the reflection signatures of the one or more customer premises equipments at periodic/defined intervals.

5. The system of claim 1, wherein the hardware is coupled with the one or more customer premises equipments through a passive fiber layout.

6. The system of claim 1, wherein the NMS is operatively coupled with one or more OTDR's through the CO.

* * * * *